(12) United States Patent
Kimura et al.

(10) Patent No.: US 9,408,148 B2
(45) Date of Patent: Aug. 2, 2016

(54) COMMUNICATION SYSTEM, COMMUNICATION METHOD, RADIO APPARATUS IN COMMUNICATION SYSTEM AND PROGRAM EXECUTED BY TERMINAL DEVICE IN COMMUNICATION SYSTEM

(71) Applicants: Advanced Telecommunications Research Institute International, Soraku-gun, Kyoto (JP); NEC Communication Systems, Ltd., Minato-ku, Tokyo (JP)

(72) Inventors: Takatoshi Kimura, Soraku-gun (JP); Yoshihisa Kondo, Soraku-gun (JP); Hiroyuki Yomo, Soraku-gun (JP); Tetsuya Ito, Minato-ku (JP); Yukihiro Hara, Minato-ku (JP)

(73) Assignees: ADVANCED TELECOMMUNICATIONS RESEARCH INSTITUTE INT, Kyoto (JP); NEC COMMUNICATION SYSTEMS, LTD., Tokyo (JP)

( * ) Notice: Subject to any disclaimer, the term of this patent is extended or adjusted under 35 U.S.C. 154(b) by 47 days.

(21) Appl. No.: 14/387,980

(22) PCT Filed: Mar. 18, 2013

(86) PCT No.: PCT/JP2013/057676
§ 371 (c)(1),
(2) Date: Sep. 25, 2014

(87) PCT Pub. No.: WO2013/146424
PCT Pub. Date: Oct. 3, 2013

(65) Prior Publication Data
US 2015/0103709 A1    Apr. 16, 2015

(30) Foreign Application Priority Data
Mar. 27, 2012    (JP) ................ 2012-070607

(51) Int. Cl.
H04W 52/02     (2009.01)
H04W 76/04     (2009.01)

(52) U.S. Cl.
CPC ........ *H04W 52/0229* (2013.01); *H04W 76/046* (2013.01)

(58) Field of Classification Search
None
See application file for complete search history.

(56) References Cited

U.S. PATENT DOCUMENTS 6,188,916 B1 *    2/2001    Noda .................... H04W 88/02
                                                      370/337
2006/0039337 A1    2/2006    Hodoshima
(Continued)

FOREIGN PATENT DOCUMENTS

JP    2006-060336 A    3/2006
JP    2009-077375 A    4/2009

OTHER PUBLICATIONS

Official Communication issued in International Patent Application No. PCT/JP2013/057676, mailed on Jun. 25, 2013.
(Continued)

*Primary Examiner* — Eunsook Choi
(74) *Attorney, Agent, or Firm* — Keating & Bennett, LLP

(57) ABSTRACT

A terminal device (1) frame-length-modulates an identifier of the radio apparatus (3) to generate a plurality of frames having a plurality of frame lengths, and transmits the generated plurality of frames to an access point (2) over wire or wireless communication. The access point (2) transfers the plurality of frames transmitted by the terminal device (1) to the radio apparatus (3) in the IP or MAC layer. The radio apparatus (3) detects the plurality of frame lengths of the plurality of frames received from the access point (2) and decodes the detected plurality of frame lengths to obtain an identifier. If the obtained identifier matches the identifier of the radio apparatus (3), the radio apparatus (3) transitions to active mode.

16 Claims, 9 Drawing Sheets

(56) References Cited

U.S. PATENT DOCUMENTS

| | | |
|---|---|---|
| 2009/0052417 A1 | 2/2009 | Sakamoto et al. |
| 2009/0157871 A1* | 6/2009 | Listyanto ............ G06F 1/1698 709/224 |
| 2012/0051241 A1* | 3/2012 | Mori ..................... H04L 12/12 370/352 |
| 2013/0034039 A1* | 2/2013 | Wong .................. H04L 12/189 370/312 |

OTHER PUBLICATIONS

Oyama et al., "Implementation of UPnP Home Network Using Ultra Low Power Wake-up IC", Society Conference, Sep. 13-16, 2011, p. 479.

Official Communication issued in JP Patent Application No. 2014-507734, mailed on Jun. 3, 2014.

* cited by examiner

| BIT SEQUENCE | FRAME LENGTH |
|---|---|
| 0000 | 710 $\mu$s |
| 0001 | 740 $\mu$s |
| 0010 | 770 $\mu$s |
| 0011 | 800 $\mu$s |
| 0100 | 830 $\mu$s |
| 0101 | 860 $\mu$s |
| 0110 | 890 $\mu$s |
| 0111 | 920 $\mu$s |
| 1000 | 950 $\mu$s |
| 1001 | 980 $\mu$s |
| 1010 | 1010 $\mu$s |
| 1011 | 1040 $\mu$s |
| 1100 | 1070 $\mu$s |
| 1101 | 1100 $\mu$s |
| 1110 | 1130 $\mu$s |
| 1111 | 1160 $\mu$s |

TBL (a)          (b)

COMMUNICATION SYSTEM, COMMUNICATION METHOD, RADIO APPARATUS IN COMMUNICATION SYSTEM AND PROGRAM EXECUTED BY TERMINAL DEVICE IN COMMUNICATION SYSTEM

TECHNICAL FIELD

The present invention relates to a communication system, a communication method, a radio apparatus in a communication system and a program executed by a terminal device in a communication system.

BACKGROUND ART

Home networks where a server may be caused to transition from sleep mode to active mode with low power consumption are known (Non-Patent Document 1).

Such a home network includes a client terminal, a proxy and a server. The proxy is located between the client terminal and the server. The client terminal is capable of communicating directly with the server, and is also capable of communicating with the server via the proxy.

When the server is in sleep mode, the client terminal sends a proxy starting signal to the proxy. The proxy receives the proxy starting signal from the client terminal and converts the received proxy starting signal to a starting signal. Then, the proxy sends the converted starting signal to the server. In response to the starting signal from the proxy, the server transitions from sleep mode to active mode.

Non-Patent Document 1; Oyama et al., "Implementation of UPnP Home Network Using Ultra Low Power Wake-Up IC", Society Conference, September 2011.

DISCLOSURE OF THE INVENTION

However, according to Non-Patent Document 1, the proxy converts a proxy starting signal to a starting signal in an application layer, and therefore transfer of a starting signal by a proxy cannot be performed by an existing access point.

The present invention was made to solve this problem; an object of the present invention is to provide a communication system where a radio apparatus may be caused to transition from sleep mode to active mode via an existing access point.

Another object of the present invention is to provide a communication method for causing a radio apparatus to transition from sleep mode to active mode via an existing access point.

Yet another object of the present invention is to provide a radio apparatus in a communication system where the radio apparatus may be caused to transition from sleep mode to active mode via an existing access point.

Still another object of the present invention is to provide a program executed by a terminal device in a communication system where a radio apparatus may be caused to transition from sleep mode to active mode via an existing access point.

According to an embodiment of the present invention, a communication system includes a terminal device, and first and second radio apparatus. The terminal device sequentially transmit, over wire communication or wireless communication, at least one frame having a desired frame length that constitutes an identifier of a radio apparatus to be transitioned from sleep mode to active mode. The first radio apparatus transfers the at least one frame by sequentially receiving the at least one frame from the terminal device and sequentially transmitting, in an IP layer or MAC layer, at least one radio frame having at least one frame length of the at least one frame that has been received. The second radio apparatus sequentially receives the at least one radio frame transferred by the first radio apparatus, detects the at least one frame length of the at least one radio frame that has been received, and, if an identifier obtained by decoding the at least one frame length that has been detected matches its own identifier, transitions from sleep mode to active mode.

According to an embodiment of the present invention, a communication method includes: a first step in which a terminal device sequentially transmits, over wire communication or wireless communication, at least one frame having a desired frame length that constitutes an identifier of a radio apparatus to be transitioned from sleep mode to active mode; a second step in which a first radio apparatus transfers the at least one frame by sequentially receiving the at least one frame from the terminal device and transmitting, in an IP layer or MAC layer, at least one radio frame having at least one frame length of the at least one frame that has been received; and a third step in which a second radio apparatus sequentially receives the at least one radio frame transferred by the first radio apparatus, detects the at least one frame length of the at least one radio frame that has been received, and, if an identifier obtained by decoding the at least one frame length that has been detected matches its own identifier, transitions from sleep mode to active mode.

According to an embodiment of the present invention, a radio apparatus includes a receiving unit, a detecting unit and a control unit. The receiving unit receives at least one radio frame from a transfer apparatus that transfers, as the at least one radio frame, at least one frame transmitted by a terminal device and having a desired frame length that constitutes an identifier of the radio apparatus to be transitioned from sleep mode to active mode. The detecting unit detects at least one frame length of the at least one radio frame received by the receiving unit. The control unit generates a driving signal for causing the radio apparatus to transition from sleep mode to active mode if an identifier obtained by decoding the at least one frame length that has been detected by the detecting unit matches an identifier of the radio apparatus.

According to an embodiment of the present invention, a program for causing a computer to perform is a program for causing a computer to perform an operation of the terminal device in the communication system according to claim 1, the program for causing the computer to perform a first step sequentially transmitting, over wire communication or wireless communication, at least one frame having a desired frame length that constitutes an identifier of a radio apparatus to be transitioned from sleep mode to active mode.

In the communication system according to an embodiment of the present invention, the terminal device transmits at least one frame generated by frame-length-modulating an identifier of the second radio apparatus, and the first radio apparatus transfers the at least one frame transmitted by the terminal device to the second radio apparatus in IP or MAC layer. If the identifier obtained by decoding the at least one radio frame received from the first radio apparatus matches the identifier of the second radio apparatus, the second radio apparatus transitions to active mode. As a result, the first radio apparatus transfers at least one frame using functions of an existing access point.

Thus, the second radio apparatus may be caused to transition to active mode via an existing access point.

In the communication method according to an embodiment of the present invention, at least one frame generated by frame-length-modulating an identifier of the second radio apparatus is transmitted from the terminal device to the first radio apparatus, and the at least one frame is transferred to the second radio apparatus in the IP or MAC layer of the first radio apparatus. Then, the at least one frame is decoded to an identifier and, if the decoded identifier matches the identifier of the second radio apparatus, the second radio apparatus transitions to active mode. As a result, at least one frame is transferred using functions of an existing access point.

Thus, the second radio apparatus may be caused to transition to active mode via an existing access point.

The radio apparatus according to an embodiment of the present invention receives at least one radio frame from a transfer apparatus that transfers, as the at least one radio frame, at least one frame transmitted by a terminal device and having a desired frame length that constitutes an identifier of the radio apparatus, and detects at least one frame length of the at least one radio frame that has been received. Then, if an identifier obtained by decoding the at least one frame length that has been detected matches the identifier of the radio apparatus, the radio apparatus generates a driving signal for causing the radio apparatus to transition from sleep mode to active mode.

Thus, the radio apparatus may be caused to transition to active mode via an existing transfer apparatus (access point).

The program according to an embodiment of the present invention, in the terminal device of the communication system according to claim 1, causes the computer to perform a first step sequentially transmitting, over wire communication or wireless communication, at least one frame having a desired frame length that constitutes an identifier of a radio apparatus to be transitioned from sleep mode to active mode. As a result, at least one frame is transferred as at least one radio frame by the first radio apparatus, and the at least one radio frame is received by the second radio apparatus and decoded to an identifier. If the decoded identifier matches the identifier of the second radio apparatus, the second radio apparatus transitions to active mode.

Thus, the second radio apparatus may be caused to transition to active mode via an existing access point.

BEST MODES FOR CARRYING OUT THE INVENTION

Figure 1:
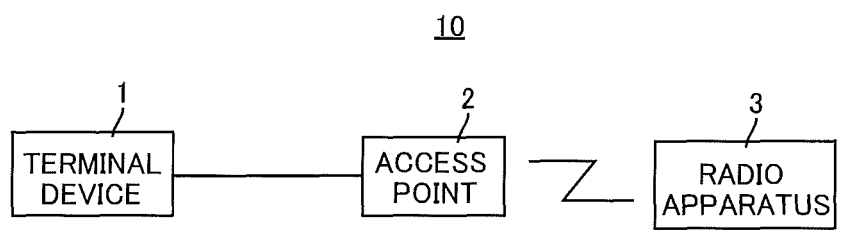
FIG. 1 is a schematic diagram of a communication system of an embodiment of the present invention.

Embodiments of the present invention will be described in detail with reference to the drawings. The same or corresponding parts in the drawings are labeled with the same numerals and their description will not be repeated.

FIG. 1 is a schematic diagram of a communication system of an embodiment of the present invention. Referring to FIG. 1, the communication system 10 according to an embodiment of the present invention includes a terminal device 1, an access point 2 and a radio apparatus 3.

When the radio apparatus 3 is intended to transition from sleep mode to active mode, the terminal device 1 constructs an identifier of the radio apparatus 3 by using a plurality of frame lengths, and sequentially transmits a plurality of frames having the plurality of frame lengths to the access point 2 over wire or wireless communication.

The access point 2 receives plurality of the frames from the terminal device 1 and, in accordance with the Carrier Sense Multiple Access/Collision Avoidance (CSMA/CA) scheme, sequentially broadcasts or unicasts to the radio apparatus 3 a plurality of radio frames that have the plurality of frame lengths of the received plurality of frames.

In this case, the access point 2 determines a transmission rate to broadcast or unicast the plurality of radio frames.

The radio apparatus 3 is allocated to the access point 2. The radio apparatus 3 sequentially receives a plurality of radio frames from the access point 2 and detects a plurality of frame lengths of the received plurality of radio frames. Then, the radio apparatus 3 decodes the plurality of frame lengths to an identifier and, if the decoded identifier matches its own identifier, transitions from sleep mode to active mode.

Figure 2:
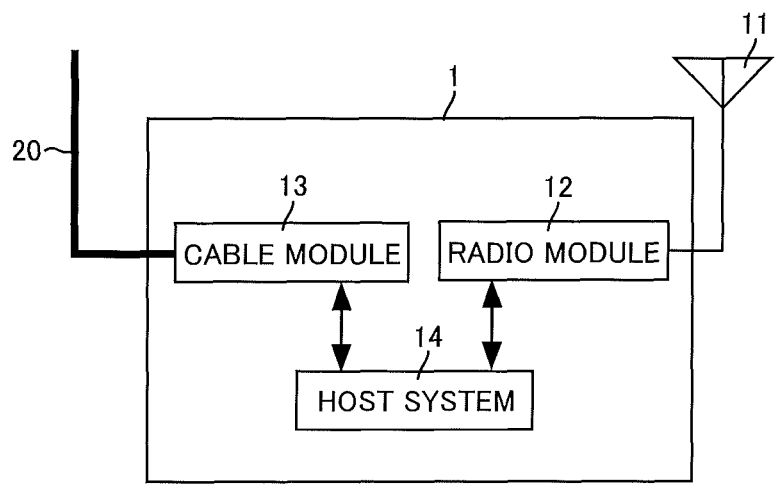
FIG. 2 is a block diagram of the terminal device shown in FIG. 1.

FIG. 2 is a block diagram of the terminal device 1 shown in FIG. 1. Referring to FIG. 2, the terminal device 1 includes an antenna 11, a radio module 12, a cable module 13, and a host system 14.

The radio module 12 receives from the host system 14 an instruction signal COM1 causing the radio apparatus 3 to transition from sleep mode to active mode, and an identifier of the radio apparatus 3. In response to the instruction signal COM1, the radio module 12 generates a plurality of frame lengths that represent an identifier of the radio apparatus 3 in the manner described below, and sequentially transmits a header made up of a broadcast address and a plurality of frames having the plurality of frame lengths to the access point 2 via the antenna 11.

In this case, the radio module 12 sequentially transmits a plurality of frames in accordance with the CSMA/CA scheme. Further, the radio module 12 determines frame lengths depending on the payload size and transmission rate and sequentially transmits the plurality of frames.

The cable module 13 is connected to the cable 20. The cable module 13 receives the instruction signal COM1 and the identifier of the radio apparatus 3 from the host system 14. In response to the instruction signal COM1, the cable module 13 generates a plurality of frame lengths that represent the identifier of the radio apparatus 3 in the manner described below, and sequentially transmits a header made up of a broadcast address and a plurality of frames having the plurality of frame lengths to the access point 2 via the cable 20.

In this case, the cable module 13 determines frame lengths depending on the payload size and transmission rate and sequentially transmits the plurality of frames.

The host system 14 holds the identifier of the radio apparatus 3. When the host system 14 causes the radio apparatus 3 to transition from sleep mode to active mode, the host system 14 outputs the instruction signal COM1 and the identifier of the radio apparatus 3 to the radio module 12 or the cable module 13.

Figure 3:
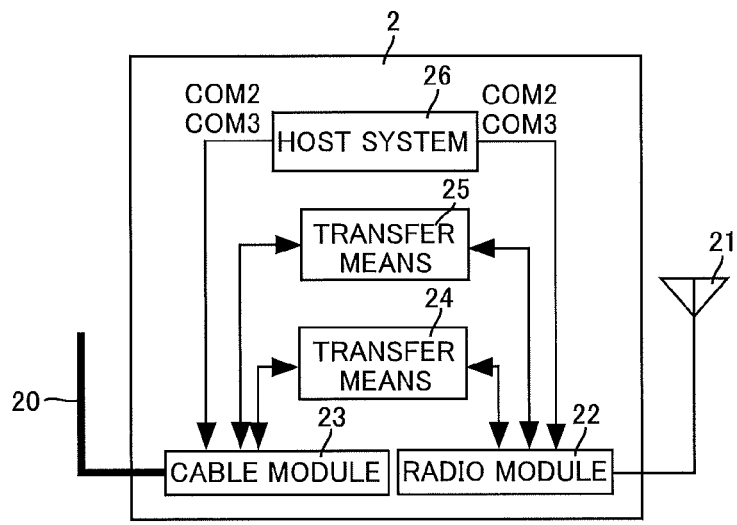
FIG. 3 is a block diagram of the access point shown in FIG. 1.

FIG. 3 is a block diagram of the access point 2 shown in FIG. 1. Referring to FIG. 3, the access point 2 includes an antenna 21, a radio module 22, a cable module 23, transfer means 24 and 25, and a host system 26.

The radio module 22 sequentially receives a header and a plurality of frames from the terminal device 1 via the antenna 21, and, in response to an instruction signal from the host system 26, outputs the received header and the plurality of frames to the transfer means 24 or 25. More specifically, when receiving an instruction signal COM2 from the host system 26, the radio module 22 outputs the header and the plurality of frames to the transfer means 24, and, upon receiving an instruction signal COM3 from the host system 26, outputs the header and a plurality of frames to the transfer means 25.

Further, the radio module 22 receives a header and a plurality of frame lengths from the transfer means 24 or 25, and, in accordance with the CSMA/CA scheme, broadcasts or unicasts the received header and a plurality of radio frames having the received plurality of frame lengths via the antenna 21.

The cable module 23 sequentially receives a header and a plurality of frames from the terminal device 1 via the cable 20, and, in response to the instruction signal COM2 or COM3 from the host system 26, outputs the received header and the plurality of frames to the transfer means 24 or 25, respectively.

The transfer means 24 is located in the Media Access Control (MAC) layer and operates in bridge mode. The transfer means 24 receives a header and a plurality of frames from the radio module 22.

When the transfer means 24 broadcast a plurality of frames, the transfer means 24 detects the plurality of frame lengths of the plurality of frames and outputs the detected plurality of frame lengths and a header received from the cable module 23 to the radio module 22.

When the transfer means 24 unicast a plurality of frames to the radio apparatus 3, the transfer means 24 generates a header made up of the MAC address of the radio apparatus 3 and detects the plurality of frame lengths of the plurality of frames, and outputs the header and the plurality of frame lengths to the radio module 22.

When the transfer means 24 operates in bridge mode, the transfer means 24 recognizes that the radio apparatus 3 is allocated to the access point 2, and thus knows the MAC address of the radio apparatus 3. Accordingly, the transfer means 24 is capable of generating a header made up of the MAC address of the radio apparatus 3.

Similarly, when receiving a header and a plurality of frames from the cable module 23, the transfer means 24 outputs the header and the plurality of frame lengths to the radio module 22 in the same manner as described above.

The transfer means 25 is located in the Internet Protocol (IP) layer and operates in router mode. The transfer means 25 receives a header and a plurality of frames from the radio module 22.

When the transfer means 25 broadcasts a plurality of frames, the transfer means 25 detects the plurality of frame lengths of the plurality of frames and outputs the detected plurality of frame lengths and a header to the radio module 22.

When the transfer means 25 unicasts a plurality of frames to the radio apparatus 3, the transfer means 25 generates a header made up of the IP address of the radio apparatus 3 and detects the plurality of frame lengths of the plurality of frames, and outputs the header and the plurality of frame lengths to the radio module 22.

When the transfer means 25 operates in router mode, since the access point 2 recognizes that the radio apparatus which is to transmit is the radio apparatus 3, the transfer means 25 knows the IP address of the radio apparatus 3. Accordingly, the transfer means 25 is capable of generating a header made up of the IP address of the radio apparatus 3.

Similarly, when the transfer means 25 receives a header and a plurality of frames from the cable module 23, the transfer means 25 also outputs the header and a plurality of frame lengths to the radio module 22 in the same manner as described above.

When the access point 2 operates in bridge mode, the host system 26 generates an instruction signal COM2 instructing that the operation mode of the access point 2 is bridge mode, and outputs the generated instruction signal COM2 to the radio module 22 and the cable module 23.

When the access point 2 operates in router mode, the host system 26 generates an instruction signal COM3 instructing that the operation mode of the access point 2 is router mode, and outputs the generated instruction signal COM3 to the radio module 22 and the cable module 23.

Figure 4:
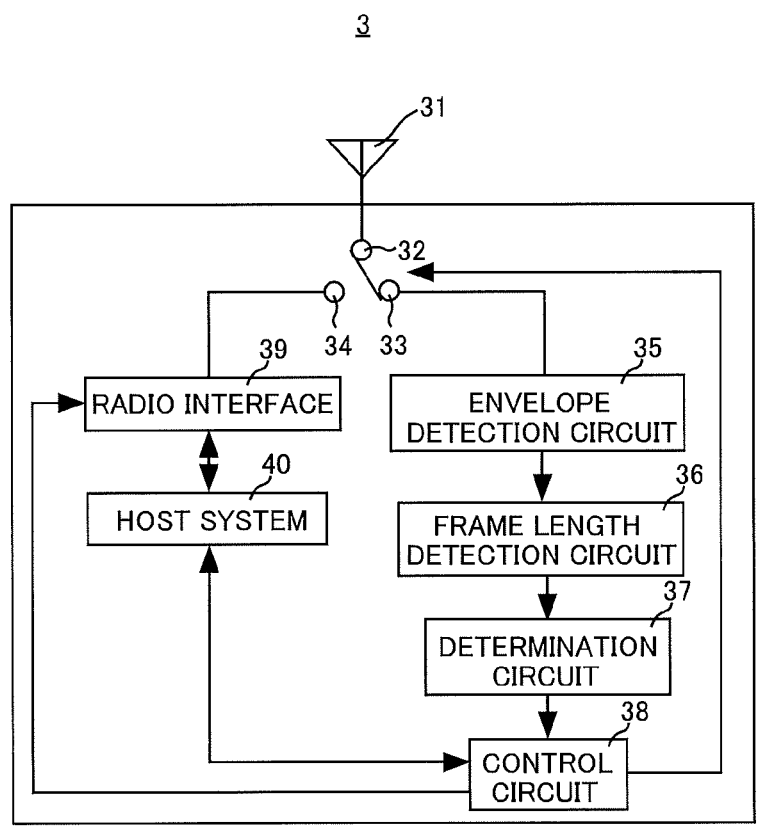
FIG. 4 is a block diagram of the radio apparatus shown in FIG. 1.

FIG. 4 is a block diagram of the radio apparatus 3 shown in FIG. 1. Referring to FIG. 4, the radio apparatus 3 includes an antenna 31, a switch 32, terminals 33 and 34, an envelope detection circuit 35, a frame length detection circuit 36, a determination circuit 37, a control circuit 38, a radio interface 39 and a host system 40.

The switch 32 is connected to the antenna 31. The terminal 33 is connected to the envelope detection circuit 35. The terminal 34 is connected to the radio interface 39.

The switch 32 is connected to the terminal 33 or 34 in accordance with control by the control circuit 38. More specifically, when the switch 32 receives a signal of L (logical low) level from the control circuit 38, the switch 32 is connected to the terminal 33. When the switch 32 receives a signal of H (logical high) level from the control circuit 38, the switch 32 is connected to the terminal 34. The switch 32 receives a reception signal via the antenna 31 and outputs the received reception signal to the envelope detection circuit 35 or the radio interface 39.

The envelope detection circuit 35 receives the reception signal from the switch 32 via the terminal 33, detects an envelope of the received reception signal, and outputs the detected envelope to the frame length detection circuit 36.

The frame length detection circuit 36 receives the envelope from the envelope detection circuit 35. Then, the frame length detection circuit 36 samples the envelope at a sampling period to convert it to a digital signal sequence, detects frame lengths based on the converted digital signal sequence, and outputs the detected frame lengths to the determination circuit 37.

The determination circuit 37 receives the frame lengths from the frame length detection circuit 36, and decodes the received frame lengths to obtain an identifier. The determination circuit 37 then determines whether the obtained identifier matches the identifier of the radio apparatus 3.

If the obtained identifier matches the identifier of the radio apparatus 3, the determination circuit 37 outputs a driving signal to the control circuit 38; if not, it outputs a sleep signal to the control circuit 38.

When the control circuit 38 receives a driving signal from the determination circuit 37, it causes the radio interface 39 and the host system 40 to transition from sleep mode to active mode. Then, the control circuit 38 outputs a signal of H level to the switch 32.

When the control circuit 38 receives a sleep signal from the determination circuit 37, it leaves the radio interface 39 and host system 40 remaining in sleep mode.

When the control circuit 38 detects that, when the radio interface 39 and host system 40 are in active mode, the host system 40 has not performed wireless communication for a certain period of time, it causes the radio interface 39 and the host system 40 to transition from active mode to sleep mode and outputs a signal of L level to the switch 32.

The radio interface 39 transitions from sleep mode to active mode or from active mode to sleep mode in accordance with control by the control circuit 38. The radio interface 39 receives a reception signal from the switch 32 via the terminal 34, demodulates and decodes the received reception signal and outputs the demodulated and decoded signal to the host system 40. Further, when the radio interface 39 receives a transmission signal from the host system 40, it modulates the received transmission signal and transmits the modulated transmission signal via the terminal 34, switch 32 and antenna 31.

The host system 40 transitions from sleep mode to active mode or from active mode to sleep mode in accordance with control by the control circuit 38. The host system 40 receives a signal from the radio interface 39. Further, the host system 40 generates a transmission signal and outputs the generated transmission signal to the radio interface 39.

"Sleep mode" of the radio apparatus 3 means that the radio interface 39 and the host system 40 stop the operation and the envelope detection circuit 35, the frame length detection circuit 36, the determination circuit 37 and the control circuit 38 are operating; "active mode" of the radio apparatus 3 means that the envelope detection circuit 35, the frame length detection circuit 36, the determination circuit 37, the control circuit 38, the radio interface 39, and the host system 40 are operating.

Figures 5, 6:
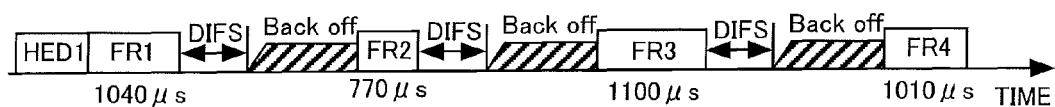
FIG. 5 illustrates the relationship between bit sequence and frame length.
FIG. 6 illustrates how a plurality of radio frames may be transmitted.

FIG. 5 illustrates the relationship between bit sequence and frame length. Referring to FIG. 5, the table TBL includes bit sequences and frame lengths. The bit sequences are associated with the frame lengths.

The frame length of 710 μs is assigned to the bit sequence "0000"; the frame length of 740 μs is assigned to the bit sequence "0001"; the frame length of 770 μs is assigned to the bit sequence "0010"; and so forth, and; the frame length of 1130 μs is assigned to the bit sequence "1110"; and the frame length of 1160 μs is assigned to the bit sequence "1111".

For example, when an identifier of the radio apparatus 3 is composed of the bit sequence "1011001011011010", the bit sequence "1011001011011010" is divided into 4-bit bit sequences "1011", "0010", "1101" and "1010".

Then, the frame length of 1040 μs is assigned to the bit sequence "1011"; the frame length of 770 μs is assigned to the bit sequence "0010"; the frame length of 1100 μs is assigned to the bit sequence "1101"; and the frame length of 1010 μs is assigned to the bit sequence "1010".

As a result, the identifier "1011001011011010" is frame-length-modulated to the frame lengths of 1040 μs/770 μs/1100 μs/1010 μs.

The host system 14 of the terminal device 1 holds the table TBL. Further, the host system 14 holds the identifier of the radio apparatus 3.

Then, the host system 14 obtains a bit sequence that represents the identifier of the radio apparatus 3. Thereafter, the host system 14 divides the obtained bit sequence into 4-bit bit sequences, and refers to the table TBL and assigns a frame length to each 4 bit sequence of the divided 4-bit bit sequences.

Then, the host system 14 outputs a header HED1 made up of a broadcast address and a plurality of frame lengths FL to the radio module 12 or the cable module 13.

If an identifier of the radio apparatus 3 is composed of a bit sequence other than the bit sequence "1011001011011010", in an analogous manner, the host system 14 assigns a plurality of frame lengths to a bit sequence constituting the identifier of the radio apparatus 3 and outputs the assigned plurality of frame lengths and the header HED1 to the radio module 12 or the cable module 13.

FIG. 6 illustrates how a plurality of radio frames may be transmitted. FIG. 6 illustrates how a plurality of radio frames are transmitted when the identifier of the radio device 3 is represented by four frame lengths: 1040 μs/770 μs/1100 μs/1010 μs.

The radio module 12 of the terminal device 1 receives from the host system 14 the header HED1 and the plurality of frame lengths 1040 μs/770 μs/1100 μs/1010 μs.

Then, the radio module 12 performs carrier sensing via the antenna 11 and, if it determines based on the result of carrier sensing that the radio communication space is available, transmits via the antenna 11 the header HED1 and a radio frame FR1 having a length of 1040 μs. In this case, the radio module 12 generates a payload Pyl1 having an arbitrary size, adjusts the transmission rate so as to result in a frame length of 1040 μs to transmit the payload Pyl1, and accordingly, transmits the radio frame FR1.

Thereafter, the radio module 12 waits for a period including a distributed coordination function interframe space (DIFS) and back off Back off, and then transmits a radio frame FR2 having a length of 770 μs via the antenna 11. Again, in this case, the radio module 12 generates a payload Pyl2 having an arbitrary size, adjusts the transmission rate so as to result in a frame length of 770 μs to transmit the payload Pyl2, and accordingly, transmits the radio frame FR2.

Subsequently, the radio module 12 waits for a period including a DIFS and back off Back off, and then transmits via the antenna 11 a radio frame FR3 having a length of 1100 μs. Again, in this case, the radio module 12 generates a payload Pyl3 having an arbitrary size, adjusts the transmission rate so as to result in a frame length of 1100 μs to transmit the payload Pyl3, and accordingly, transmits the radio frame FR3.

Then, the radio module 12 waits for a period including a DIFS and back off Back off, and then transmits via the antenna 11 a radio frame FR4 having a length of 1010 μs. Again, in this case, the radio module 12 generates a payload Pyl4 having an arbitrary size, adjusts the transmission rate so as to result in a frame length of 1010 μs to transmit the payload Pyl4, and accordingly, transmits the radio frame FR4.

When the radio module 12 determines based on the result of carrier sensing that the wireless communication space is not available, it waits to transmit the header HED1 and the plurality of frames FR1 to FR4.

When an identifier of the radio apparatus 3 is represented by a plurality of frame lengths other than the four frame lengths 1040 μs/770 μs/1100 μs/1010 μs, the radio module 12 also transmits a header HED1 and a plurality of radio frames in an analogous manner.

When an identifier of the radio apparatus 3 is transmitted to the access point 2 over wire communication, the cable module 13 receives from the host system 14 a header HED1 and the plurality of frame lengths 1040 μs/770 μs/1100 μs/1010 μs.

Then, the cable module 13 sequentially transmits the header HED1 and the plurality of frame lengths 1040 μs/770 μs/1100 μs/1010 μs received from the host system 14, to the access point 2 via the cable 20.

Figure 7:
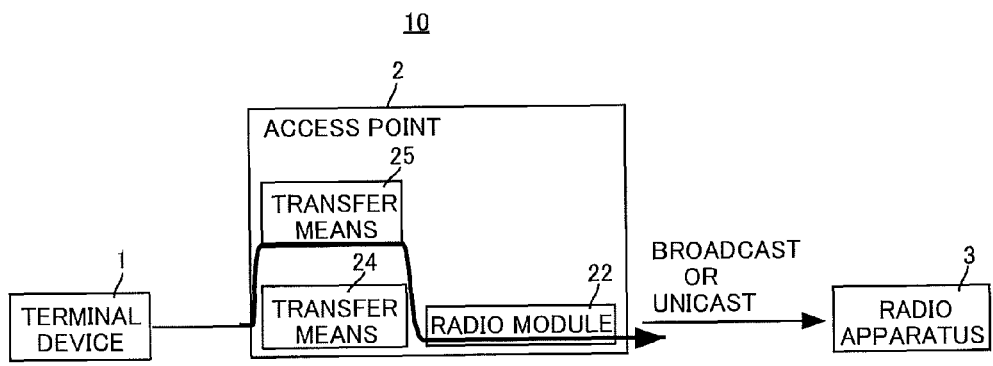
FIG. 7 illustrates how transfer occurs in router mode.

FIG. 7 illustrates how transfer occurs in router mode. Referring to FIG. 7, if the access point 2 operates in router mode, the radio module 22 or the cable module 23, upon reception of the header HED1 and the plurality of frames FR1 to FR4 from the terminal device 1, outputs the received header HED1 and the plurality of frames FR1 to FR4 to the transfer means 25.

When the transfer means 25 broadcasts a plurality of radio frames, the transfer means 25 outputs the header HED1 and the plurality of frames FR1 to FR4 to the radio module 22.

When the radio module 22 receives the header HED1 and the plurality of frames FR1 to FR4 from the transfer means 25, it performs carrier sensing via the antenna 21 and, if the wireless communication space is available as a result of the carrier sensing, broadcasts the header HED1 and a plurality of radio frames FR5 to FR8 having the plurality of frame lengths via the antenna 21 in the manner illustrated in FIG. 6. In this case, the radio module 22 transmits signals at a fixed transmission rate that has been set and fixed in advance, a fixed transmission rate that is sufficiently low to allow the signals to reach all the radio apparatus allocated to itself (for example, 1 Mbps), or a fixed transmission rate that was used when wireless communication was conducted last. If radio frames are transmitted at a fixed transmission rate of 1 Mbps, the terminal device 1 in advance transmits the plurality of frames FR1 to FR4 so as to have frame lengths of 1040 μs, 770 μs, 1100 μs and 1010 μs. Thus, by setting the transmission rate for the plurality of frames FR1 to FR4 to 1 Mbps, the radio module 22 can generate payloads Pyl5 to Pyl8 to have frame lengths of 1040 μs, 770 μs, 1100 μs and 1010 μs. Then, the radio module 22 sequentially transmits the payloads Pyl5 to Pyl8 at a transmission rate of 1 Mbps to broadcast the plurality of radio frames FR5 to FR8.

If the wireless communication space is not available as a result of the carrier sensing, the radio module 22 waits to transmit the header HED1 and the plurality of radio frames FR5 to FR8.

On the other hand, when the transfer means 25 unicasts radio frames, there is no ACK response from the radio apparatus 3 and, accordingly, the transfer means 25 transmits radio frames by a method of transmitting unicast frames in the access point 2, described below.

In this manner, when the access point 2 operates in router mode, the access point 2 transfers the header HED1 and the plurality of frames FR1 to FR4 using a transfer means 25 located in the IP layer. That is, the access point 2 transfers the header HED1 and the plurality of frames FR1 to FR4 in the IP layer.

Thus, the header HED1 and the plurality of frames FR1 to FR4 may be transferred without adding new functions to a conventional access point. That is, the header HED1 and the plurality of frames FR1 to FR4 may be transferred using an existing access point.

The radio module 22 of the access point 2 uses a fixed transmission rate to transfer a header HED1 and a plurality of frames FR1 to FR4 because an existing access point receives and transmits packets at a fixed transmission rate that has been set and fixed in advance, a fixed transmission rate that is sufficiently low to allow the packets to reach all the radio apparatus allocated to itself (for example, 1 Mbps), or a fixed transmission rate that was used when wireless communication was conducted last. Thus, as a header HED1 and a plurality of frames FR1 to FR4 are transferred using a fixed transmission rate, again, an existing access point may be used to transfer the header HED1 and frames FR1 to FR4.

Figure 8:
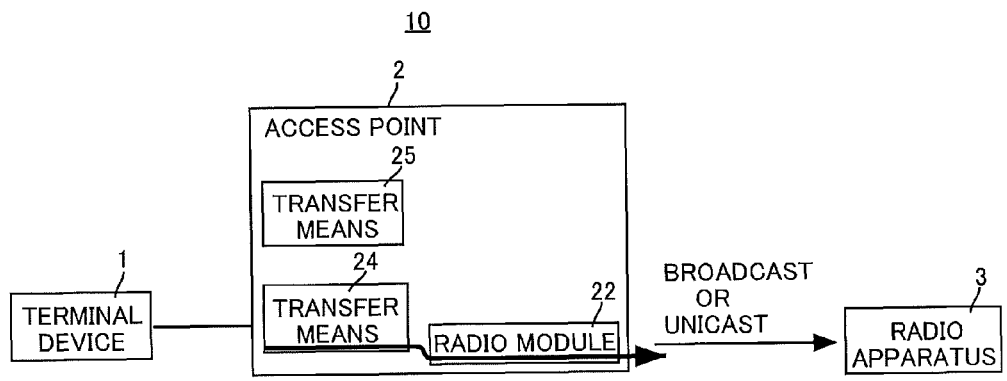
FIG. 8 illustrates how transfer occurs in bridge mode.

FIG. 8 illustrates how transfer occurs in bridge mode. Referring to FIG. 8, when the access point 2 operates in bridge mode, the radio module 22 or the cable module 23, upon reception of the header HED1 and the plurality of frames FR1 to FR4 from the terminal device 1, outputs the received header HED1 and the plurality of frames FR1 to FR4 to the transfer means 24.

Then, when the transfer means 24 broadcasts a plurality of radio frames, the transfer means 24 outputs the header HED1 and frames FR1 to FR4 to the plurality of radio module 22.

When the radio module 22 receives the header HED1 and the plurality of frames FR1 to FR4 from the transfer means 24, it broadcasts the header HED1 and a plurality of radio frames FR5 to FR8 having the plurality of frame lengths of the plurality of frames FR1 to FR4 in the manner described above.

On the other hand, when the transfer means 24 unicasts radio frames, there is no ACK response from the radio apparatus 3, as in the case where the transfer means 25 unicasts radio frames, and, accordingly, the transfer means 24 transmits radio frames by a method of transmitting unicast frames in the access point 2, described below.

In this manner, when the access point 2 operates in bridge mode, the access point 2 transfers the header HED1 and the plurality of frames FR1 to FR4 using the transfer means 24 located in the MAC layer. That is, the access point 2 transfers the header HED1 and the plurality of frames FR1 to FR4 in the MAC layer.

Thus, the header HED1 and the plurality of frames FR1 to FR4 may be transferred without adding new functions to a conventional access point. That is, the header HED1 and the plurality of frames FR1 to FR4 may be transferred using an existing access point.

The radio module 22 of the access point 2 uses a fixed transmission rate to transfer the header HED1 and the plurality of frames FR1 to FR4 for the same reasons as described above.

When the access point 2 broadcasts a plurality of radio frames FR5 to FR8, the radio module 12 of the terminal device 1 may receive the broadcast plurality of radio frames FR5 to FR8.

When the radio module 12 of the terminal device 1 receives the plurality of radio frames FR5 to FR8, it can detect the transmission rate of the plurality of radio frames FR5 to FR8.

Thus, when the radio module 12 of the terminal device 1 transmits radio frames thereafter, it determines a payload size so as to have desired frame lengths when using the detected transmission rate, and accordingly, transmits the radio frames.

Figure 9:
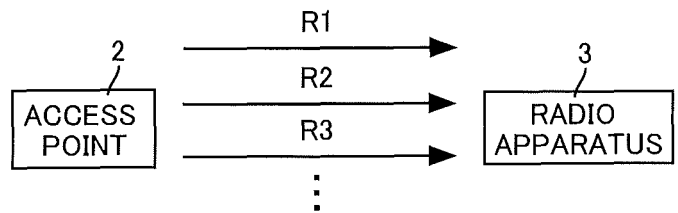
FIG. 9 illustrates how transfer is performed by the access point.

FIG. 9 illustrates a transmission method in the access point 2. Referring to FIG. 9, when the access point 2 transmits radio frames by unicast, the radio module 22 of the access point 2 transmits radio frames to the radio apparatus 3 using the transmission rate R1 that was used when wireless communication was conducted last, as described above.

When the radio module 22 of the access point 2 does not receive ACK from the radio apparatus 3 after transmitting radio frames using the transmission rate R1, it reduces the transmission rate from the transmission rate R1 to the transmission rate R2 to transmit radio frames.

When the radio module 22 of the access point 2 does not receives ACK from the radio apparatus 3 after transmitting radio frames using the transmission rate R2, it reduces the transmission rate from the transmission rate R2 to the transmission rate R3 to transmit radio frames.

Then, in a similar manner, when the radio module 22 of the access point 2 does not receive ACK from the radio apparatus 3 after transmitting radio frames, it reduces the transmission rate to transmit radio frames.

The transmission rates R1 to R3 may be, for example, 54 Mbps, 48 Mbps and 32 Mbps, respectively.

Thus, when the access point 2 does not receive ACK from the radio apparatus 3 after transmitting radio frames, it reduces the transmission rate to transfer radio frames. Thus, in a wireless communication environment where a frame length of a radio frame may become smaller than the original frame length, the frame length of the radio frame may be set to the original frame length. As a result, it can be suppressed that the radio apparatus 3 erroneously transitions to active mode or the radio apparatus 3 fails to transition to active mode.

Figure 10:
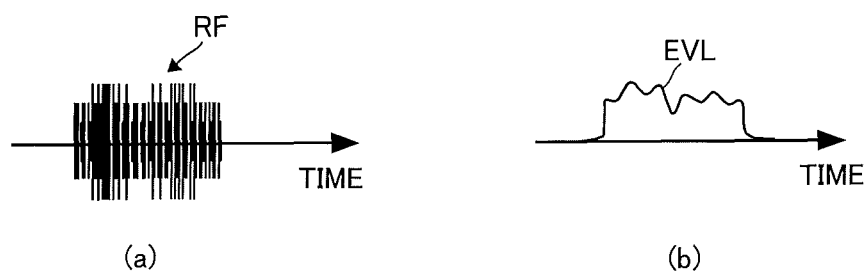
FIG. 10 conceptually illustrates a radio signal and envelope.
Figure 11:
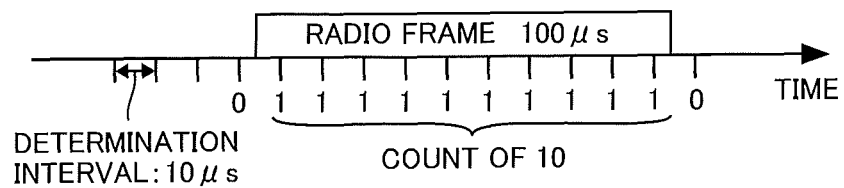
FIG. 11 illustrates how a frame length is detected.

FIG. 10 conceptually illustrates a radio signal and an envelope. FIG. 11 illustrates how a frame length is detected.

The envelope detection circuit 35 receives a radio signal via the antenna 21 and detects an envelope of a received reception signal RF (see FIG. 10($a$)) to detect the envelope EVL (see FIG. 10($b$)). Then, the envelope detection circuit 35 outputs the detected envelope EVL to the frame length detection circuit 36.

The frame length detection circuit 36 receives the envelope EVL from the envelope detection circuit 35, compares the received envelope EVL with a threshold and converts the envelope EVL, which is an analog signal, to a digital signal. In this case, the threshold is set to −82 [dBm], for example. The frame length detection circuit 36 determines at a determination period whether the converted digital signal is "0" or "1" and counts the number of "1". The determination period is set to 10 µs, for example.

Next, the frame length detection circuit 36 multiplies the count of "1" (=10) by the determination period (=10 µs) to detect the frame length of the radio frame (=100 µs) (see FIG. 11). Then, the frame length detection circuit 36 outputs the detected frame length to the determination circuit 37.

A method of decoding a frame length in the determination circuit 37 will be described. In the case where an identifier of the radio apparatus 3 is frame-length modulated by the four frame lengths shown in FIG. 6, i.e. 1040 µs, 770 µs, 1100 µs and 1010 µs to be transmitted, the determination circuit 37 incorporates the table TBL.

Upon reception of the frame length of 1040 µs from the frame length detection circuit 36, the determination circuit 37 refers to the table TBL and converts the frame length of 1040 µs to the bit sequence "1011".

Thereafter, upon reception of the frame length of 770 µs from the frame length detection circuit 36, the determination circuit 37 refers to the table TBL and converts the frame length of 770 µs to the bit sequence "0010".

Then, in a similar manner, the determination circuit 37 converts the frame length of 1100 µs to the bit sequence "1101", and converts the frame length of 1010 µs to the bit sequence "1010".

Thus, the determination circuit 37 obtains the identifier composed of the bit sequence "1011001011011010".

When the obtained bit sequence "1011001011011010" matches the identifier of the radio apparatus 3, the determination circuit 37 generates a driving signal and outputs it to the control circuit 38. On the other hand, if the obtained bit sequence "1011001011011010" does not match the identifier of the radio apparatus 3, the determination circuit 37 generates a sleep signal and outputs it to the control circuit 38.

When the radio apparatus 3 is allocated to the access point 2, but has not performed wireless communication with the access point 2 for a certain period of time, the access point 2 considers the radio apparatus 3 to be not allocated to itself any more, and does not transfer the plurality of frames FR1 to FR4 transmitted from the terminal device 1. As a result, the terminal device 1 cannot cause the radio apparatus 3 to transition from sleep mode to active mode via the access point 2.

To prevent this, the radio apparatus 3, when in sleep mode, autonomously transitions to active mode at a certain interval (for example, 5 seconds), and transmits to the access point 2 a blank NULL packet for the access point 2.

Thus, even when there is no normal wireless communication between the access point 2 and the radio apparatus 3, the access point recognizes that the radio apparatus 3 is allocated to itself and, thus, upon reception of the plurality of frames FR1 to FR4 from the terminal device 1, transfers the received plurality of frames FR1 to FR4 to the radio apparatus 3 in the manner described above.

Therefore, the terminal device 1 can cause the radio apparatus 3 to transition from sleep mode to active mode via the access point 2 at any time.

At a certain interval (for example, 5 seconds), the radio apparatus 3 transmits to the terminal device 1 a packet that contains an identifier for activating itself on a next occasion. In this case, the radio apparatus 3 changes its identifier at a certain interval and transmits it to the terminal device 1. That is, the radio apparatus 3 updates its identifier at a certain interval.

As such, the security of the communication system 10 can be improved.

Figure 12:
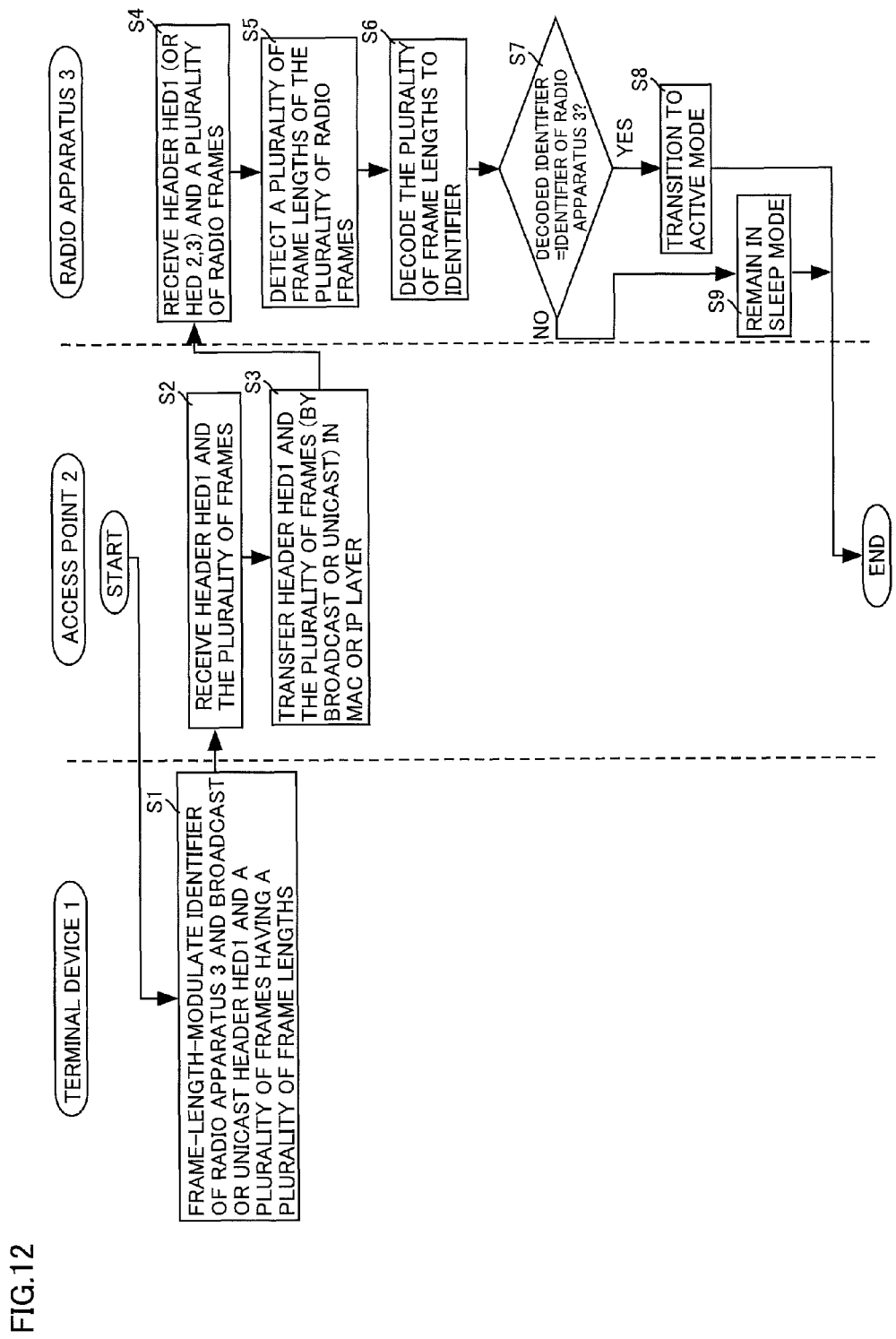
FIG. 12 is a flow chart illustrating operations of the communication system shown in FIG. 1.

FIG. 12 is a flow chart illustrating operations of the communication system 10 shown in FIG. 1.

Referring to FIG. 12, upon starting the operation of the communication system 10, the terminal device 1 frame-length-modulates the identifier of the radio apparatus 3 in the manner described above, and broadcasts or unicasts, over wire or wireless communication, the header HED1 and the plurality of frames having the plurality of frame lengths (step S1).

The access point 2 receives the header HED1 and the plurality of frames over wire or wireless communication (step S2).

Then, the access point 2 transfers, by broadcasting or unicasting, the header HED1 and the plurality of frames using the IP or MAC layer in the manner described above (step S3).

The radio apparatus 3 receives the header HED1 (or HED2, 3) and the plurality of radio frames (step S4), and detects the plurality of frame lengths of the plurality of radio frames in the manner described above (step S5).

Then, the radio apparatus 3 decodes the plurality of frame lengths to an identifier in the manner described above (step S6), and determines whether the decoded identifier matches the identifier of the radio apparatus 3 (step S7).

If it is determined at the step S7 that the decoded identifier matches the identifier of the radio apparatus 3, the radio apparatus 3 transitions to active mode (step S8).

On the other hand, if it is determined at the step S7 that the decoded identifier does not match the identifier of the radio apparatus 3, the radio apparatus 3 remains in sleep mode (step S9).

After the step S8 or S9, a series of operation ends.

Figure 13:
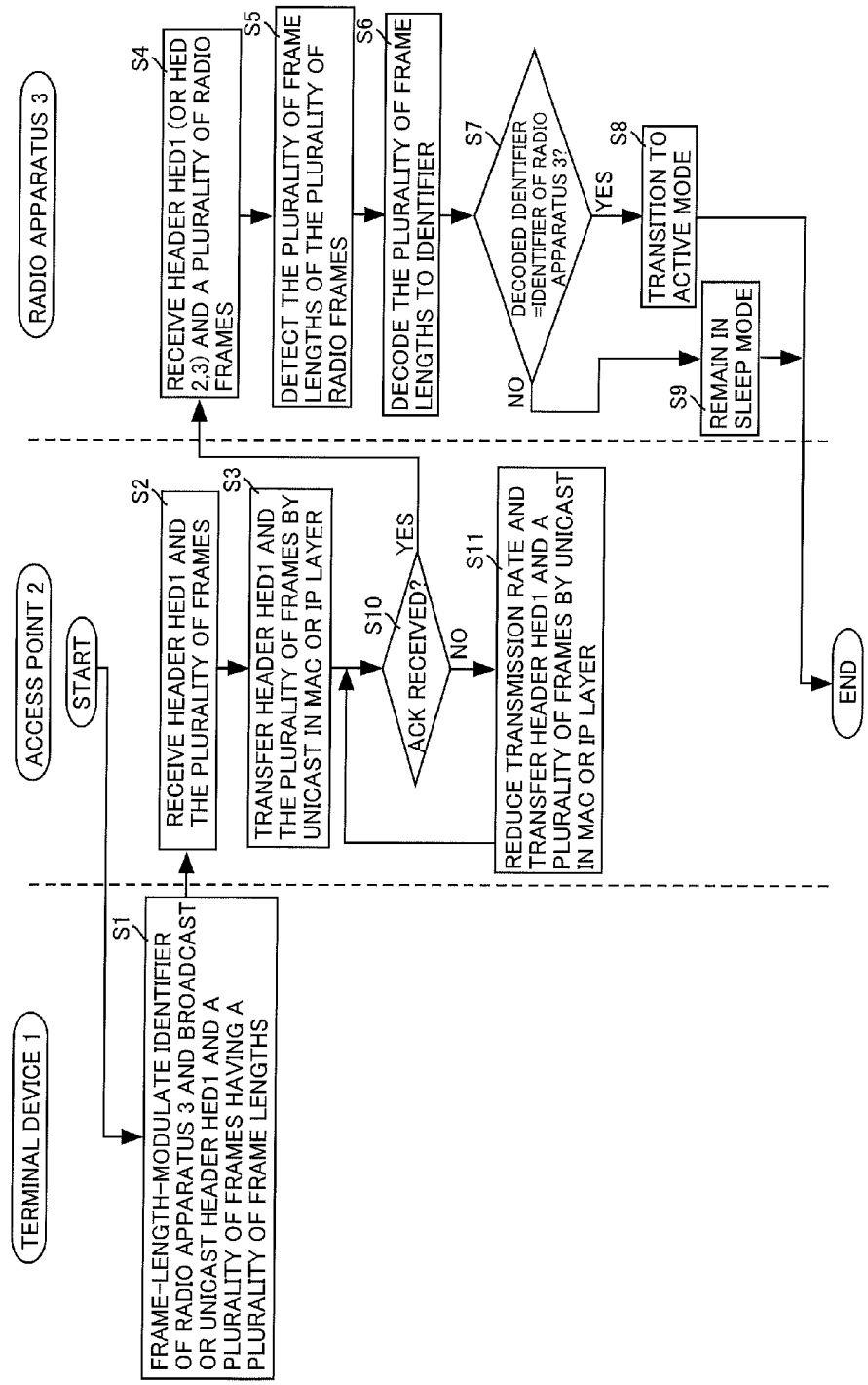
FIG. 13 is another flow chart illustrating operations of the communication system 10 shown in FIG. 1.

FIG. 13 is another flow chart illustrating operations of the communication system 10 shown in FIG. 1. The flow chart shown in FIG. 13 shows a flow chart in the case that the access point 2 transfers a plurality of frames by unicast.

The flow chart shown in FIG. 13 is the same as that shown in FIG. 12 except that steps S10 and S11 are added to the flow chart shown in FIG. 12.

Referring to FIG. 13, upon starting the operation of the communication system 10, the terminal device 1 performs the step S1 described above, and the access point 2 sequentially performs the steps S2 and S3 described above. At the step S3, the access point 2 transfers the header HED1 and the plurality of frames by unicasting.

After the step S3, the access point 2 determines whether it has received ACK from the radio apparatus 3 (step S10).

If it is determined at the step S10 that the access point 2 has not received ACK from the radio apparatus 3, the access point 2 reduces the transmission rate to transfer the header HED1 and the plurality of frames in the MAC or IP layer by unicast (step S11).

Thereafter, a series of operation returns to step S10, and the steps S10 and S11 are repeated until it is determined at the step S10 that the access point 2 has received ACK from the radio apparatus 3.

Then, if it is determined at the step S10 that the access point 2 has received ACK from the radio apparatus 3, the radio apparatus 3 sequentially performs the steps S4 to S9, described above. Thus, a series of operation ends.

When the step S11 is performed at least once and thereafter the steps S4 to S9 are performed, the radio apparatus 3 detects frame lengths taking the reduced transmission rate into consideration at the step S5.

For example, in the case that the transmission rate of 54 Mbps is normally used between the access point 2 and the radio apparatus 3, if the transmission rate is reduced from 54 Mbps to 48 Mbps, the frame length detection circuit 36 of the radio apparatus 3 detects frame lengths using the method illustrated in FIG. 11, and multiplies the detected frame lengths by (48/54) to detect the frame lengths.

When the transmission rate is reduced, a frame length is increased by the reduction quantity of the transmission rate, and therefore the frame length is corrected using the reduction in the transmission rate and the original frame length is detected.

Therefore, the identifier of the radio apparatus 3 can be decoded accurately.

Figure 14:
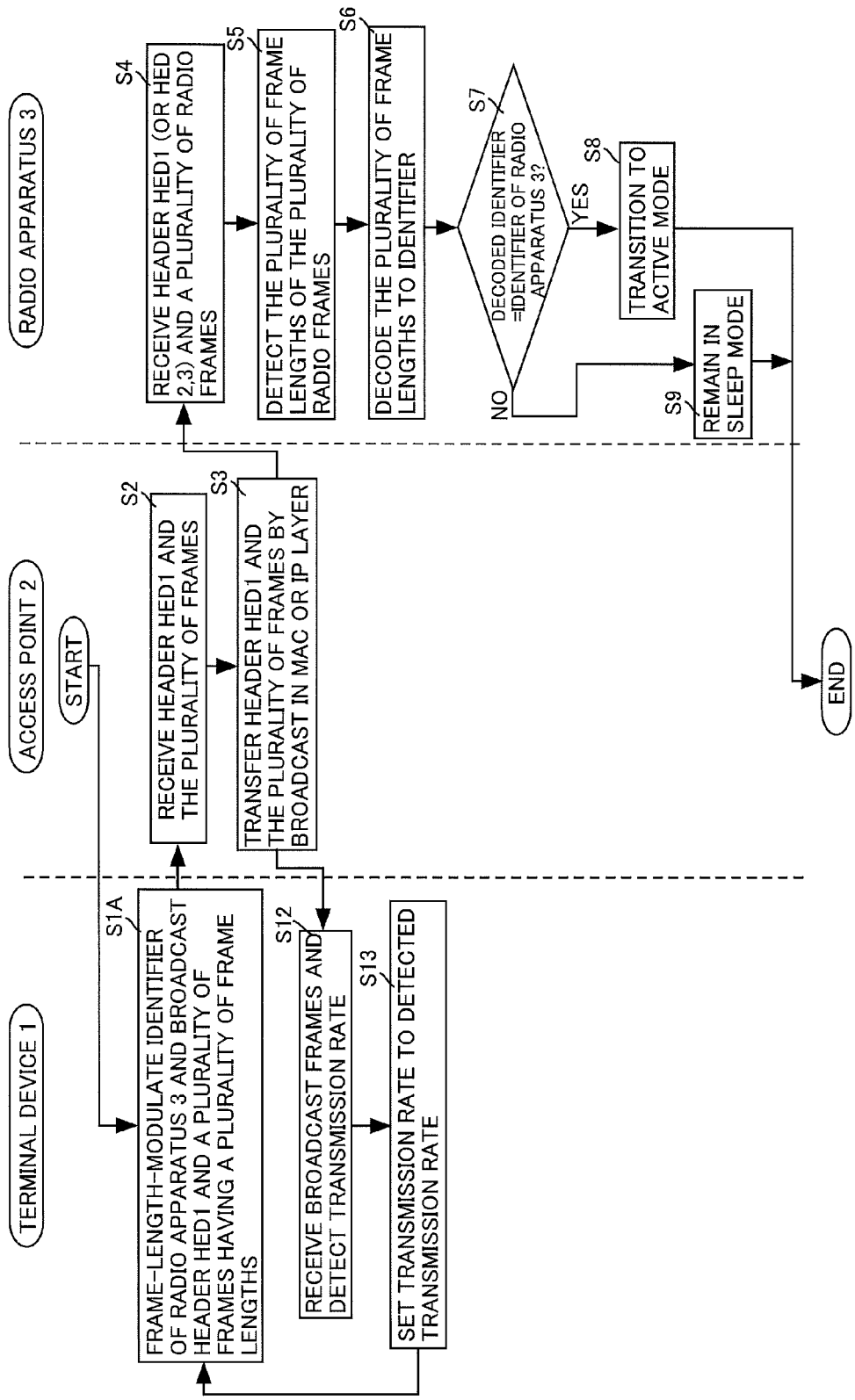
FIG. 14 is yet another flow chart illustrating operations of the communication system shown in FIG. 1.

FIG. 14 is yet another flow chart illustrating operations of the communication system 10 shown in FIG. 1. The flow chart shown in FIG. 14 shows a flowchart in the case that the access point 2 transfers a plurality of frames by broadcast.

The flow chart shown in FIG. 14 is the same as that shown in FIG. 12 except that the step S1 in the flow chart shown in FIG. 12 is replaced by step S1A and steps S12 and 13 are added.

Referring to FIG. 14, upon starting a series of operation, the terminal device 1 frame-length-modulates the identifier of the radio apparatus 3 in the manner described above and broadcasts, over wire or wireless communication, the header HED1 and the plurality of frames having the plurality of frame lengths (step S1A). Then, the access point 2 sequentially performs the steps S2 and S3, described above, and the radio apparatus 3 sequentially performs the steps S4 to S9, described above.

At the step S3, the access point 2 broadcasts the header HED1 and the plurality of frames.

When the access point 2 has performed the step S3, the terminal device 1 receives the broadcast frames and detects the transmission rate for the received frames (step S12).

Then, the terminal device 1 sets its transmission rate to the detected transmission rate (step S13).

Thereafter, at the step S1A, the terminal device 1 determines a payload size so as to have desired frame lengths using the set transmission rate, and broadcasts a plurality of frames.

In this manner, the terminal device 1 can quickly obtain the transmission rate by receiving the frames broadcast by the access point 2, thereby facilitating adjustments of the frame lengths of the consecutive plurality of frames such that the frame lengths change in an intended manner.

The steps S10 and S11 described above may be added to the flow chart shown in FIG. 14.

Figure 15:
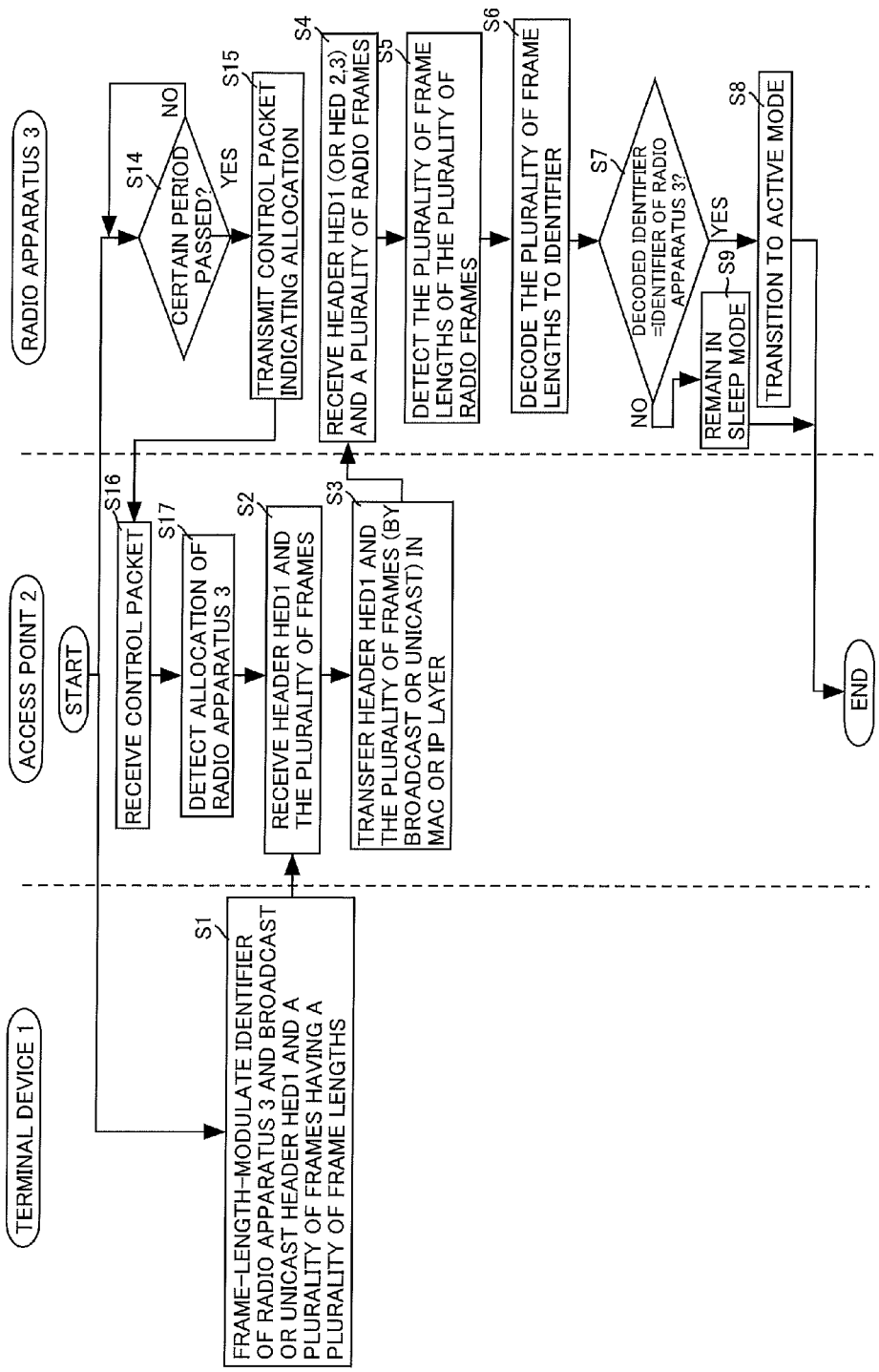
FIG. 15 is still another flow chart illustrating operations of the communication system shown in FIG. 1.

FIG. 15 is still another flow chart illustrating operations of the communication system 10 shown in FIG. 1.

The flow chart shown in FIG. 15 is the same as that shown in FIG. 12 except that steps S14 to S17 are added to the flow chart shown in FIG. 12.

Referring to FIG. 15, upon starting a series of operation, the radio apparatus 3 determines whether a certain period has passed (step S14) and, if so, generates a control packet CTL indicating that it is allocated to the access point 2 (i.e. a NULL packet) and transmits it to the access point 2 (step S15).

Then, the access point 2 receives the control packet CTL (step S16) and, based on the received control packet CTL, detects that the radio apparatus 3 is allocated to itself (step S17).

The steps S14 to S17 are performed in parallel with the steps S1 to S9.

Thus, the access point 2 can determine that the radio apparatus 3 is allocated to it even when there is no normal wireless communication between it and the radio apparatus 3, and, when it receives a plurality of frames from the terminal device 1, it transfers the received plurality of frames to the radio apparatus 3 (see steps S2 and S3).

As a result, the terminal device 1 can cause the radio apparatus 3 to transition to active mode even when there is no normal wireless communication between the access point 2 and radio apparatus 3.

A control packet CTL is generated by the host system 40 of the radio apparatus 3 and transmitted via the radio interface 39 and the antenna 31.

At the step S15, the identifier of the radio apparatus 3 may be changed at fixed internals and a control packet CTL containing the changed identifier of the radio apparatus 3 may be transmitted. In this case, the control circuit 38 of the radio apparatus 3 causes the radio interface 39 and host system 40 to transition to active mode at fixed internals, and the host system 40 changes the identifier of the radio apparatus 3 at fixed internals and transmits a control packet CTL containing the changed identifier of the radio apparatus 3 via the radio interface 39 and the antenna 21. Therefore, the security of the communication system 10 can be improved.

Further, the steps S10 and S11 described above may be added to the flow chart shown in FIG. 15, the steps S12 and S13 may be added to the flow chart shown in FIG. 15, and the steps S10 to S13 may be added to the flow chart shown in FIG. 15.

The step S1 shown in FIGS. 12, 13 and 15 constitutes a program that causes a computer to execute operations of the terminal device 1. The steps S1, S12 and S13 shown in FIG. 14 constitute a program that causes a computer to execute operations of the terminal device 1.

In this case, the terminal device 1 includes a central processing unit (CPU) and a read only memory (ROM), and the program constituted by step S1 and the program constituted by steps S1, S12 and S13 are stored in the ROM. The CPU reads the programs stored in the ROM and executes the read programs. Thus, the operations of the terminal device 1 are performed.

In the above description, the terminal device 1 transmits the plurality of frame lengths that represent the identifier of the radio apparatus 3 at a fixed transmission rate; however, an embodiment of the present invention is not limited to such an arrangement; the terminal device 1 may transmit the plurality of frame lengths that represent the identifier of the radio apparatus 3 at a determined transmission rate.

In the above description, the terminal device 1 transmits, over wire or wireless communication, a plurality of frames having the plurality of frame lengths that represent the identifier of the radio apparatus 3; however, an embodiment of the present invention is not limited to such an arrangement; the terminal device 1 may transmit, over wire or wireless communication, at least one frame having a desired frame length that represents the identifier of the radio apparatus 3. In this case, the access point 2 receives at least one frame from the terminal device 1 and transfers the received at least one frame in the manner described above, and the radio apparatus 3 receives at least one radio frame transferred by the access point 2, decodes the at least one frame length of the received at least one radio frame to obtain an identifier, and, if the obtained identifier matches its own identifier, transitions from sleep mode to active mode.

In an embodiment of the present invention, the terminal device 1 may transmit at least one frame that represents the identifier of the radio apparatus 3 in the form of a delivery frame that can be received by itself. Delivery frame means a frame that can be broadcast or multicast.

In the above description, if the access point 2 does not receive ACK from the radio apparatus 3 after transmitting a radio frame, the access point reduces the transmission rate to transfer a radio frame; however, an embodiment of the present invention is not limited to such an arrangement; if the access point 2 does not receive ACK from the radio apparatus 3 after transmitting a radio frame, the access point 2 may change the transmission rate to transfer a radio frame. That is, if the access point 2 does not receive ACK from the radio apparatus 3 after transmitting a radio frame, the access point 2 may increase or decrease the transmission rate to transfer a radio frame.

In this manner, the frame length of a radio frame may be set to the original frame length in a radio communication environment where the frame length of a radio frame changes. As a result, it can be suppressed that the radio apparatus 3 erroneously transitions to active mode or the radio apparatus 3 from fails to transition to active mode.

Then, in the case where the access point 2 changes the transmission rate to transfer a radio frame, the radio apparatus 3 takes the change in the transmission rate into consideration to correct the at least one frame length of at least one radio frame that has been received and, if the identifier obtained by decoding the corrected at least one corrected frame length matches its own identifier, transitions from sleep mode to active mode.

In the above description, when a certain period of time has passed, the radio apparatus 3 transmits to the access point 2 a control packet CTL indicating that it is allocated to the access point 2 (i.e. a NULL packet); however, an embodiment of the present invention is not limited to such an arrangement; when a certain period of time has passed, the radio apparatus 3 may transmit to the access point 2 any frame indicating that it is allocated to the access point 2.

In the above description, the radio apparatus 3 updates its identifier at a certain interval; however, an embodiment of the present invention is not limited to such an arrangement; the radio apparatus 3 may update its identifier at any interval.

In the above description, the radio apparatus 3 detects an envelope of a reception wave of a radio frame; however, an embodiment of the present invention is not limited to such an arrangement; the radio apparatus 3 may detect a reception wave of a radio frame in a synchronized manner or in a regenerative manner. In this case, the radio apparatus 3 includes, in place of the envelope detection circuit 35, a synchronous detection circuit or a regenerative detection circuit.

It should be understood that the embodiments disclosed herein are exemplary in every respect and not limitative. The scope of the present invention is not defined by the embodiments described above but the claims, and is intended to cover all the modifications in the spirit and scope equivalent to those of the claims.

INDUSTRIAL APPLICABILITY

The present invention is useful in a communication system, a communication method, a radio apparatus in a communication system and a program executed by a terminal device in a communication system.

The invention claimed is:

1. A communication system comprising: a terminal device sequentially transmitting, over wire communication or wireless communication, at least one frame having a desired frame length that constitutes an identifier of a radio apparatus to be transitioned from sleep mode to active mode;
   a first radio apparatus transferring the at least one frame by sequentially receiving the at least one frame from the terminal device and transmitting at least one radio frame having at least one frame length of the at least one frame that has been received, the first radio apparatus not transmitting any radio signals during both a period before the first radio apparatus transmits the radio frame and a period after the first radio apparatus transmits the radio frame; and
   a second radio apparatus sequentially receiving the at least one radio frame transferred by the first radio apparatus, detecting the at least one frame length of the at least one radio frame that has been received, and, if an identifier obtained by decoding the at least one frame length that has been detected matches its own identifier, transitioning from sleep mode to active mode.

2. The communication system according to claim 1, wherein, when the first radio apparatus transfers the at least one frame at a fixed transmission rate, the terminal device sequentially transmits the at least one frame so as to have the desired frame length based on the transmission rate used by the first radio apparatus.

3. The communication system according to claim 1, wherein the terminal device receives a radio frame transferred by the first radio apparatus, detects a transmission rate of the received radio frame, and determines a payload size such that the desired frame length is obtained at the detected transmission rate to sequentially transmit the at least one frame.

4. The communication system according to claim 3, wherein the at least one frame transmitted by the terminal device is a delivery frame receivable by the terminal device.

5. The communication system according to claim 1, wherein, when there is no response from the second radio apparatus after the first radio apparatus transmits the radio frame, the first radio apparatus changes a transmission rate to transfer the radio frame, and
   the second radio apparatus corrects the detected frame length taking a change in the transmission rate into consideration to obtain a corrected frame length, and, if an identifier obtained by decoding the corrected frame length matches its own identifier, transitions from sleep mode to active mode.

6. The communication system according to claim 5, wherein the first radio apparatus reduces the transmission rate to transfer the radio frame, and the second radio apparatus corrects the detected frame length taking a reduction in the transmission rate into consideration to obtain a corrected frame length.

7. The communication system according to claim 1, wherein, at an arbitrary period, the second radio apparatus transmits to the first radio apparatus an arbitrary frame indicating that it is allocated to the first radio apparatus.

8. The communication system according to claim 1, wherein the identifier of the second radio apparatus is updated at an arbitrary period.

9. A non-transitory computer readable medium including a computer program for causing a computer to perform, when the computer program is executed by the computer, a method of operating the terminal device in the communication system according to claim 1 including a first step sequentially transmitting, over wire communication or wireless communication, at least one frame having a desired frame length that constitutes an identifier of a radio apparatus to be transitioned from sleep mode to active mode.

10. The non-transitory computer readable medium including the computer program according to claim 9, for further causing the computer to perform, when the computer program is executed by the computer, the method including a second step for receiving a radio frame transferred by the first radio apparatus and detecting a transmission rate of the received radio frame, wherein, in the first step, the at least one frame are sequentially transmitted at the transmission rate detected by the second step.

11. A communication method comprising:

a first step in which a terminal device sequentially transmits, over wire communication or wireless communication, at least one frame having a desired frame length that constitutes an identifier of a radio apparatus to be transitioned from sleep mode to active mode;

a second step in which a first radio apparatus transfers the at least one frame by sequentially receiving the at least one frame from the terminal device and transmits at least one radio frame having at least one frame length of the at least one frame that has been received; and a third step in which a second radio apparatus sequentially receives the at least one radio frame transferred by the first radio apparatus, detects the at least one frame length of the at least one radio frame that has been received, and, if an identifier obtained by decoding the at least one frame length that has been detected matches its own identifier, transitions from sleep mode to active mode; wherein in the second step, there are no radio signals transmitted during a period before the first radio apparatus transmits the radio frame and there are no radio signals transmitted during a period after the first radio apparatus transmits the radio frame.

12. A radio apparatus comprising: a receiver that receives at least one radio frame from a transfer apparatus that transfers, as the at least one radio frame, at least one frame transmitted by a terminal device and having a desired frame length that constitutes an identifier of the radio apparatus to be transitioned from sleep mode to active mode, the transfer apparatus not transmitting any radio signals during both a period before the first radio apparatus transmits the radio frame and a period after the first radio apparatus transmits the radio frame;

detecting circuitry that detects at least one frame length of the at least one radio frame received by the receiver; and control circuitry that generates a driving signal for causing the radio apparatus to transition from sleep mode to active mode if an identifier obtained by decoding the at least one frame length that has been detected by the detecting circuitry matches an identifier of the radio apparatus.

13. The radio apparatus according to claim 12, further comprising: transmitting circuitry that transmits to the transfer apparatus an arbitrary frame indicating that the radio apparatus is allocated to the transfer apparatus when a certain period of time has passed.

14. The radio apparatus according to claim 13, wherein the transmitting circuitry updates the identifier of the radio apparatus at an arbitrary period and transmit the updated identifier to the terminal device.

15. The radio apparatus according to claim 12, wherein the detecting circuitry takes into consideration a change in a transmission rate of the at least one radio frame to detect the at least one frame length.

16. The radio apparatus according to claim 15, wherein the detecting circuitry takes into consideration a reduction in the transmission rate of the at least one radio frame to detect the at least one frame length.

* * * * *